United States Patent [19]

Takagi

[11] Patent Number: 5,073,735

[45] Date of Patent: Dec. 17, 1991

[54] STEPPING MOTOR HAVING A MOLDED HOUSING

[75] Inventor: Kunio Takagi, Aichi, Japan

[73] Assignee: Aisan Kogyo Kabushiki Kaisha, Aichi, Japan

[21] Appl. No.: 728,656

[22] Filed: Jul. 11, 1991

[30] Foreign Application Priority Data

Jul. 16, 1990 [JP] Japan ............................... 2-75458[U]

[51] Int. Cl.$^5$ ........................ H02K 37/04; H02K 5/22; H02K 5/26

[52] U.S. Cl. ......................................... 310/71; 310/43; 310/49 R; 310/89; 310/91; 310/194; 310/254

[58] Field of Search .......... 310/43, 45, 49 R, 40 MM, 310/51, 71, 91, 89, 179, 180, 194, 216, 217, 254

[56] References Cited

U.S. PATENT DOCUMENTS

| | | | |
|---|---|---|---|
| 4,518,886 | 5/1985 | Kaneyuki | 310/71 |
| 4,720,646 | 1/1988 | Torimoto | 310/71 |
| 4,727,274 | 2/1988 | Adam et al. | 310/239 |
| 4,866,317 | 9/1989 | Katayama | 310/89 |
| 5,006,742 | 4/1991 | Strobl et al. | 310/88 |

Primary Examiner—Steven L. Stephan
Assistant Examiner—Dennis R. Haszko
Attorney, Agent, or Firm—Koda and Androlia

[57] ABSTRACT

A stepping motor having a cylindrical stator core which is a laminate of plates each formed by blanking of a thin silicon steel plate, stator coils wound on an inner peripheral surface of the stator core, a support member fixed to a part of an outer peripheral surface of the stator core and holding a plurality of terminal plates, and a housing formed by injection molding of a synthetic resin so as to cover the outer peripheral surface of the stator core and an outer surface of the support member. First end portions of the terminal plates are made projected through the housing to the exterior of the housing and are surrounded by a socket wall integral with the housing to form a male connector, while second end portions of the terminal plates are connected with end portions of electric wires which constitute the stator coils, and are embedded in the housing. The distance from an engaging surface of the support member which engages one end face of the stator core up to the first end portions of the terminal plates which constitute the male connector is made coincident with a predetermined value and in this state the support member is held in a predetermined position inside the socket wall.

5 Claims, 5 Drawing Sheets

STEPPING MOTOR HAVING A MOLDED HOUSING

BACKGROUND OF THE INVENTION

1. Field of the Invention

The present invention relates to a stepping motor having a molded housing of a synthetic resin which covers an outer peripheral portion of a stator and in which connections of coils wound round bobbins and connector plates are embedded.

2. Description of the Prior Art

Stepping motors are used in various fields, for example as servo motors in flow control valves for the intake of auxiliary air in automobile engines. Particularly, in stepping motors used in places where external vibrations are transmitted to the motors, or in stepping motors used in a highly humid outside air, it is desired that their housings which cover the outer peripheries of their stators be formed by molding using a synthetic resin and that the connections between coils wound round the stator core and terminal plates for connection with an external controller be embedded in a synthetic resin.

As shown in FIG. 1, a stator 102 of a conventional stepping motor 101 is provided with an annular stator core 106, in which silicon steel plates formed by blanking are laminated and fixed. The stator core 106 has on an inner peripheral surface thereof a plurality of axially extending grooves and ridges alternately in the circumferential direction; bobbins 104 formed of an insulating material, which cover both axial ends of the stator core 106 and the surfaces of the grooves; and stator coils 105 wound round the ridges from above the bobbins 104. Both ends of electric wires which constitute each stator coil 105 of the stator 102 are drawn out and connected to plural terminal plates 103. The terminal plates 103 are arranged in two rows to form a male connector 111 and are supported beforehand by a support member 108 formed of a synthetic resin.

The stator 102 and the terminal plates 103 are fixed to a mold (not shown) by which a housing 109 shown in FIG. 1 is formed by injection molding of a synthetic resin. The housing 109 is fixed to a cylindrical outer peripheral surface of the stator core 106. The bobbins 104 at both axial end faces of the stator core 106, exposed portions of the stator coils 105, electric wires drawn out from both ends of each stator coils 105 and connected to the terminal plates 103, and the support member 108, are embedded in the housing 109. Free end portions of the terminal plates 103 are fixed to the housing 109 so as to project to the exterior of the housing, and form a male connector 111 together with a socket wall 110 formed integrally with the housing 109. The numeral 107 in the drawings denotes a metal cover.

In molding the housing 109, in order to place the terminal plates 103 in predetermined positions inside the socket wall 110 to be formed, it is necessary that, with one axial end face (suface M in FIG. 1) of the stator core 106 as a fiducial plane, the support member 108 is to be fixed to the stator core 106 to place one row of the terminal plates 103 at a position where the distance between the row of the terminal plates 103 and the fiducial plane M is set at a predetermined standard distance Ho.

However, since the stator core 106 is a laminate of thin plates formed by blanking and there are variations in the thickness of the plates, an axial distance between the other axial end face P of the stator core 106 and the fiducial plane M is not always the same in all of products. Therefore, when the support member 108 is fixed to the end face P, there is formed a housing 109 wherein the distance from the fiducial plane M to one row of terminal plates 103 is different from a predetermined standard distance Ho, resulting in that a female connector cannot be smoothly engaged with the male connector 111.

Further, when the stator 102 is fixed into a mold for molding, since the electric wires drawn out from the stator coils 105 of the stator 102 to the terminal plates 103 are not fixed, the electric wire may be cut by the flow of resin injected into the mold, or the soldered connection of the electric wires and the terminal plates 103 may be broken.

SUMMARY OF THE INVENTION

It is a primary object of the present invention to provide a stepping motor having a molded housing of good quality in which the foregoing predetermined standard distance Ho is controlled to an exact value.

It is another object of the present invention to provide a stepping motor having a housing formed by molding having no breakage of electric wires drawn out from stator coils and connected to terminal plates which is to be caused during molding.

According to the present invention there is provided a stepping motor comprising a stator core which is a laminate of silicon steel plates formed by blanking, the stator core having a cylindrical outer peripheral surface and a plurality of axially extending ridges and grooves formed alternately on an inner peripheral surface thereof; bobbins formed of an insulating material and held in abutment with both axial end faces of the stator core; a plurality of stator coils wound round the ridges from above the bobbins; a first support member formed of an insulating material and fixed to a part of the outer peripheral surface of the stator core, the first support member having an engaging surface for abutment with a first end face out of both axial end faces of the stator core; a second support member which is in abutment with an end portion of the first support member and which is formed of an insulating material and fixed to part of the outer peripheral surface of the stator core between the end portion of the first support member and a second end face of the stator core; a plurality of terminal plates each having a central portion fixed in the interior of the second support member, a first end portion and a second end portion out of both end portions thereof, the first end portion being projected in a radial direction of the stator core, and the second end portion being projected in the axial direction of the stator core and extended along an outer surface of the first support member, the second end portions of the terminal plates being connected to end portions of electric wires which constitute the stator coils; a housing formed by molding of a synthetic resin, the housing covering the cylindrical peripheral surface of the stator core, the outer surfaces of the first and second support members, further covering the bobbins and stator coils projecting from both axial end faces of the stator core; and a male connector comprising the first end portions of the terminal plates extending in the radial direction of the stator core from the second support member and being made projected through the housing to an outer peripheral surface of the housing and a socket wall formed integrally with the housing in surrounding relation to the first end portions of the terminal plates.

According to the present invention, the distance (a) between the engaging surface of the first support member which abuts the first end face of the stator core and the end portion thereof which abuts the second support member, and the distance (b) between one row of terminal plates and the end portion of the second support member which abuts the first support member, can be controlled exactly to predetermined values at the time of production of the first and second support members. Therefore, with the first end face out of both axial end faces of the stator core as a fiducial plane (the surface M in FIG. 1), by bringing the engaging surface of the first support member into abutment with the first end face and fixing the second support member to the outer peripheral surface of the stator core with the end portion thereof being in abutment with the end portion of the first supporting member, the distance (a+b) between the fiducial plane and said one row of terminal plates can be made exactly coincident with a predetermined standard distance Ho, and it is possible to form a male connector in which the first end portions of the terminal plates are held in predetermined positions with respect to the socket wall formed integrally with the housing.

In the present invention, moreover, when a plurality of grooves are formed in the peripheral edge wall of the bobbin which is in abutment with the first end face out of both axial end faces of the stator core and electric wires drawn out from the stator coils and connected to the second ends as free ends of the terminal plates are retained in the grooves, it is possible to prevent the electric wires from being broken by flowing, molten, synthetic resin at the time of injection molding of the housing.

BRIEF DESCRIPTION OF THE DRAWINGS

Various other objects, features and attendent advantages of the present invention will be more fully appreciated as same becomes better understood from the following detailed description when considered in connection with the accompanying drawings in which like reference characters designate like or corresponding parts through the several views and wherein.

DETAILED DESCRIPTION OF THE PREFERRED EMBODIMENT

Figure 1:
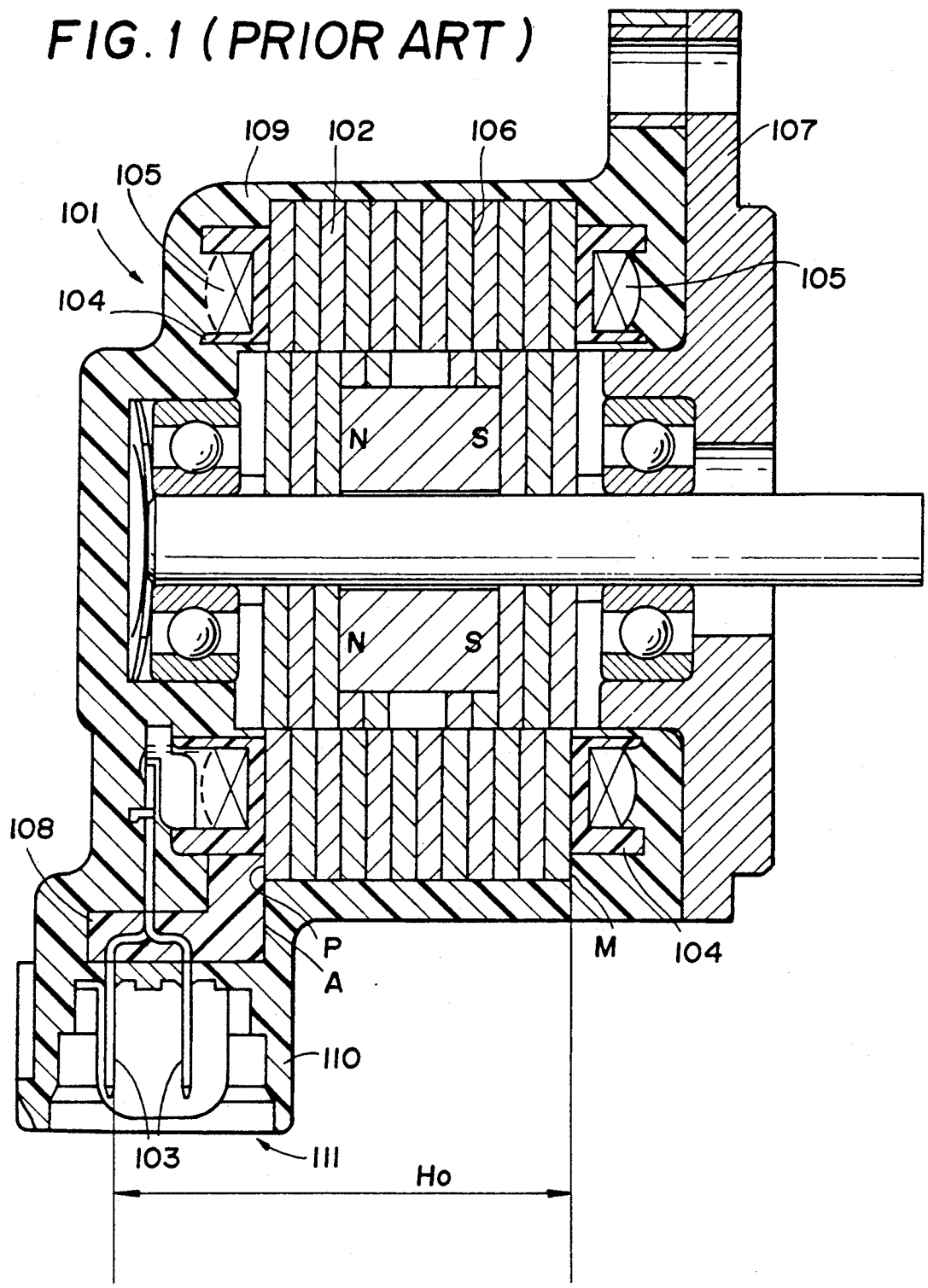
FIG. 1 is a sectional view of a stepping motor according to the prior art.
Figure 2:
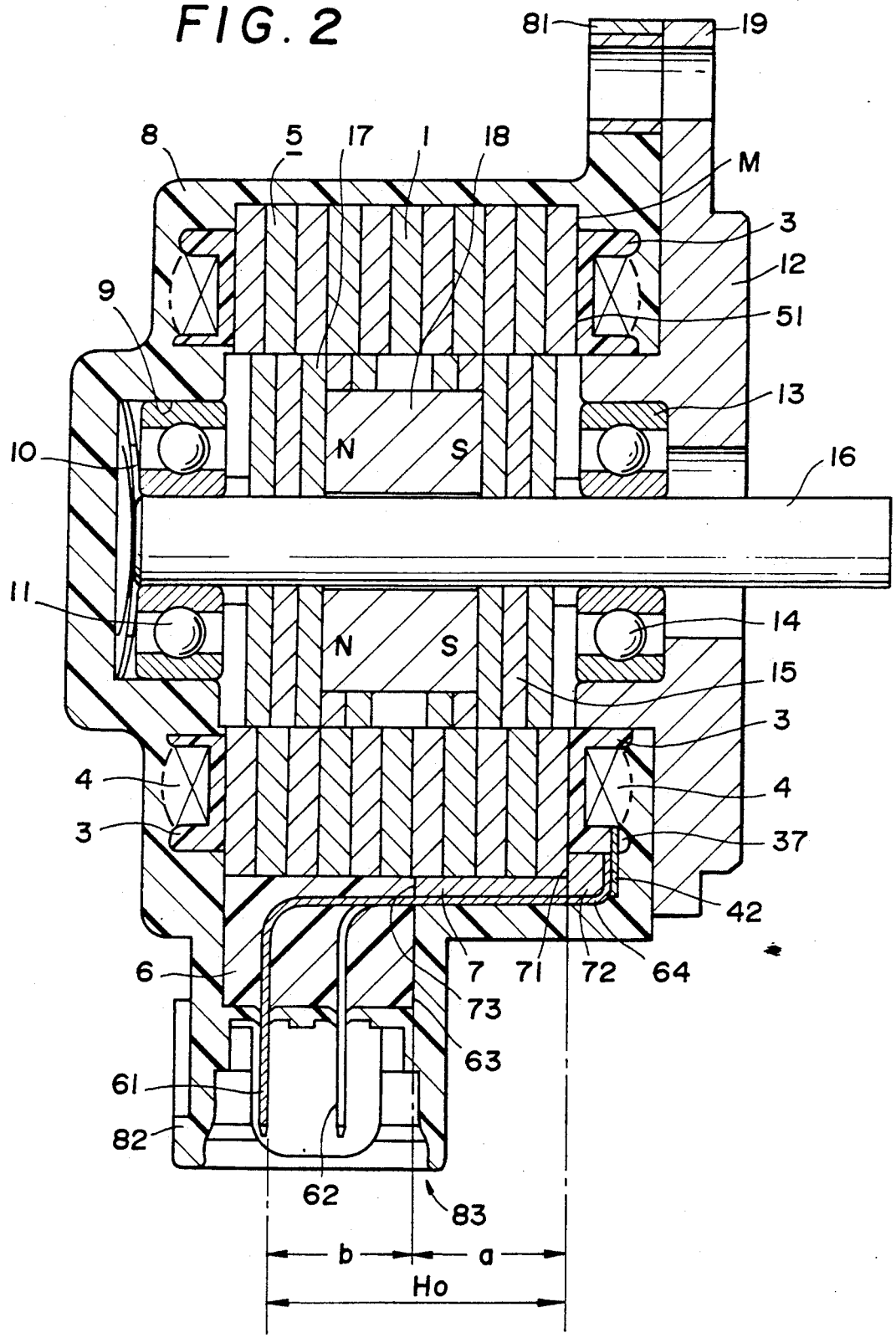
FIG. 2 is a sectional view of a stepping motor according to the present invention.
Figure 3:
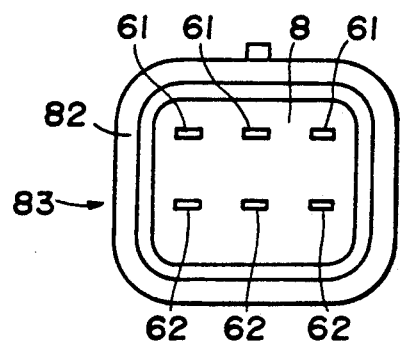
FIG. 3 is a side view of a male connector formed in a housing of the stepping motor.
Figure 4:
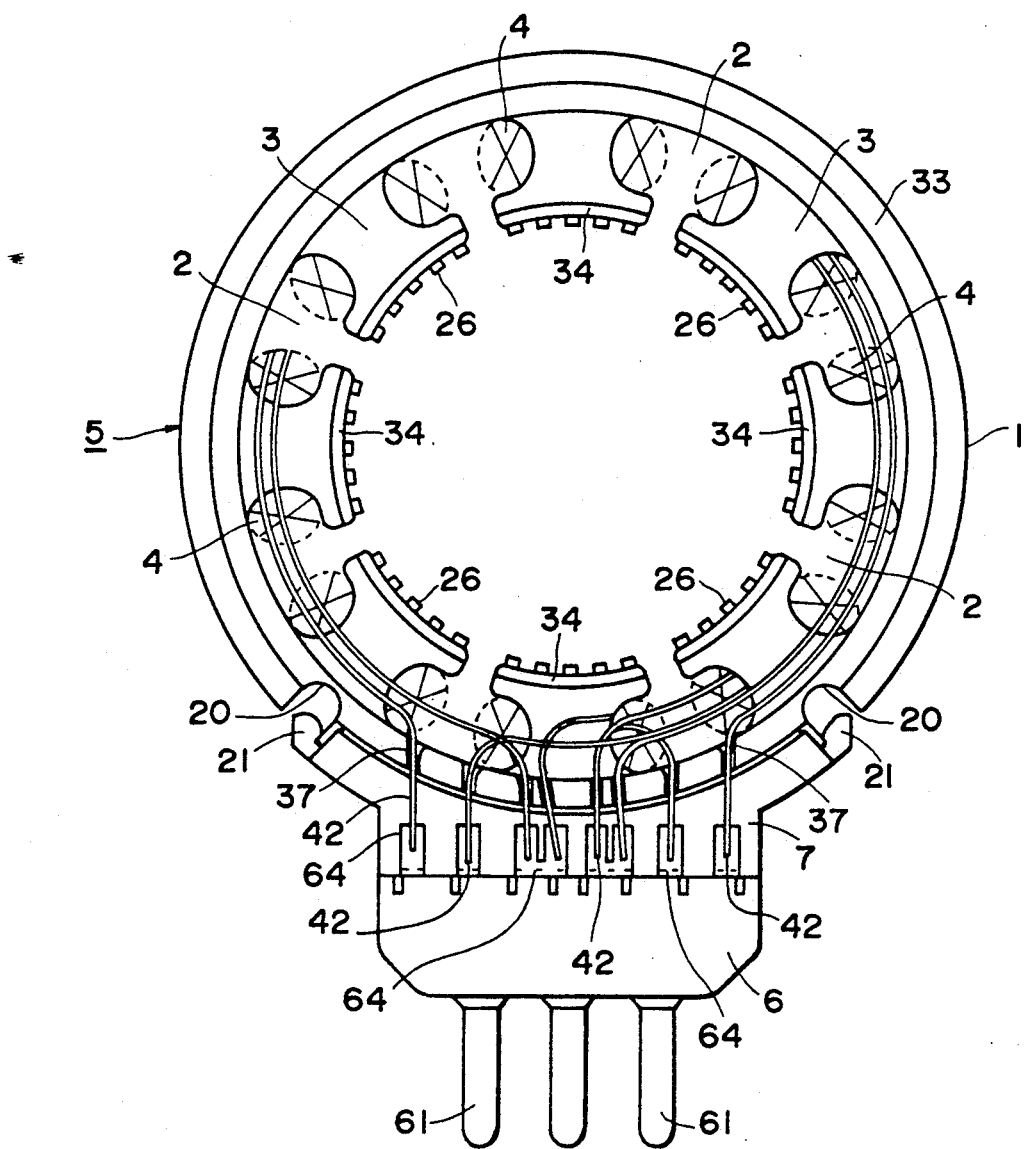
FIG. 4 is a front view showing a mounted state of a stator before molding of the housings.
Figure 5:
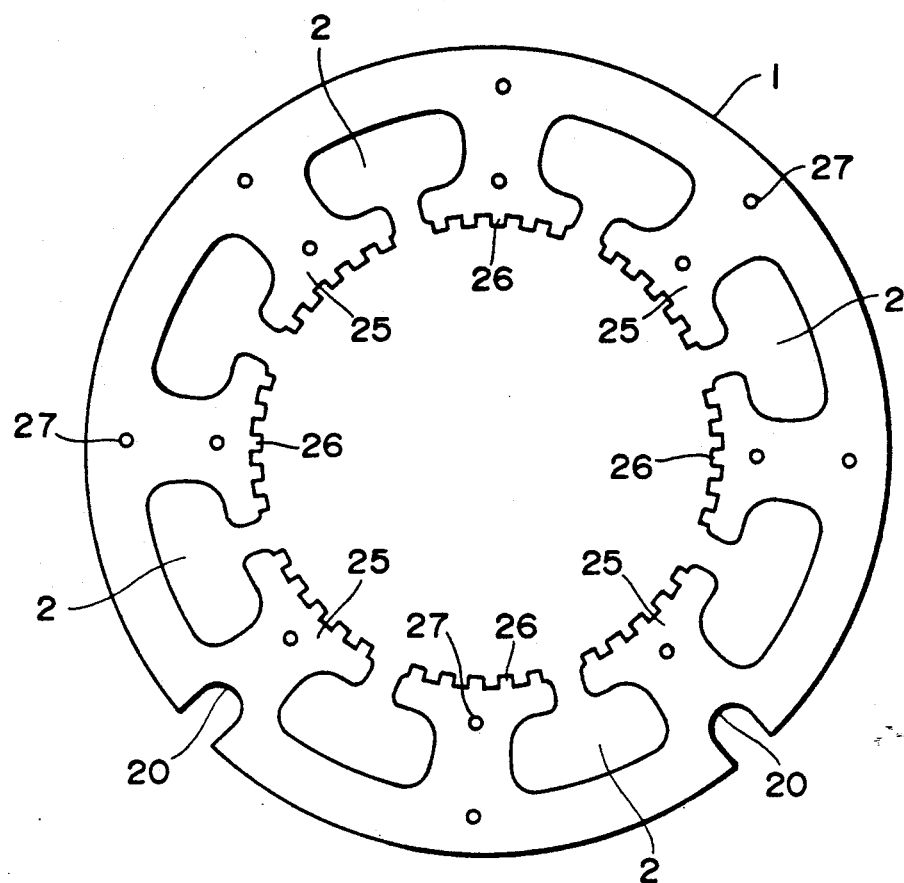
FIG. 5 is a front view of a stator core of the stator.
Figure 6:
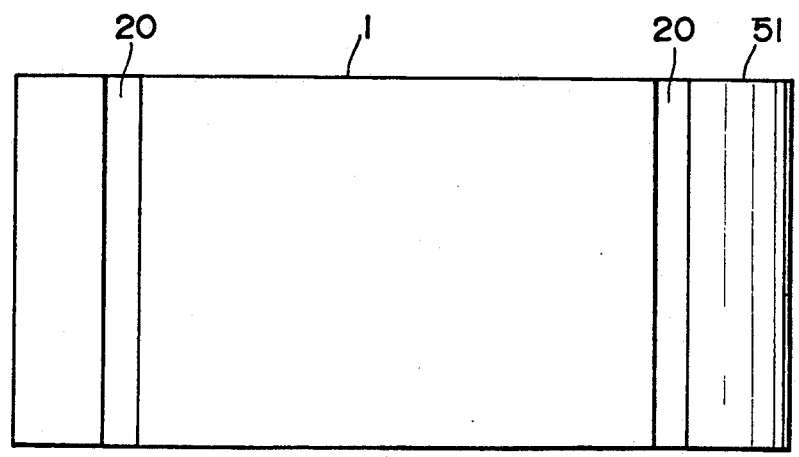
FIG. 6 is a side view thereof.

A stator core 1 shown in FIGS. 2 and 4 is formed cylindrically by blanking thin silicon steel plates into the shape shown in FIG. 5, then laminating the plates in the thickness direction and driving pins into small holes 27 formed at the time of the blanking, to fix the plates. On the inner peripheral surface of the stator core 1 there are formed plural (eight each) grooves 2 and ridges 25 extending axially of the stator core 1 and alternately in the circumferential direction. Further, on the inner peripheral surface of each ridge 25 there are formed several ridge-like pole teeth 26 of a small width extending in parallel with the axial direction of the stator core 1 and at equal intervals.

Figure 7:
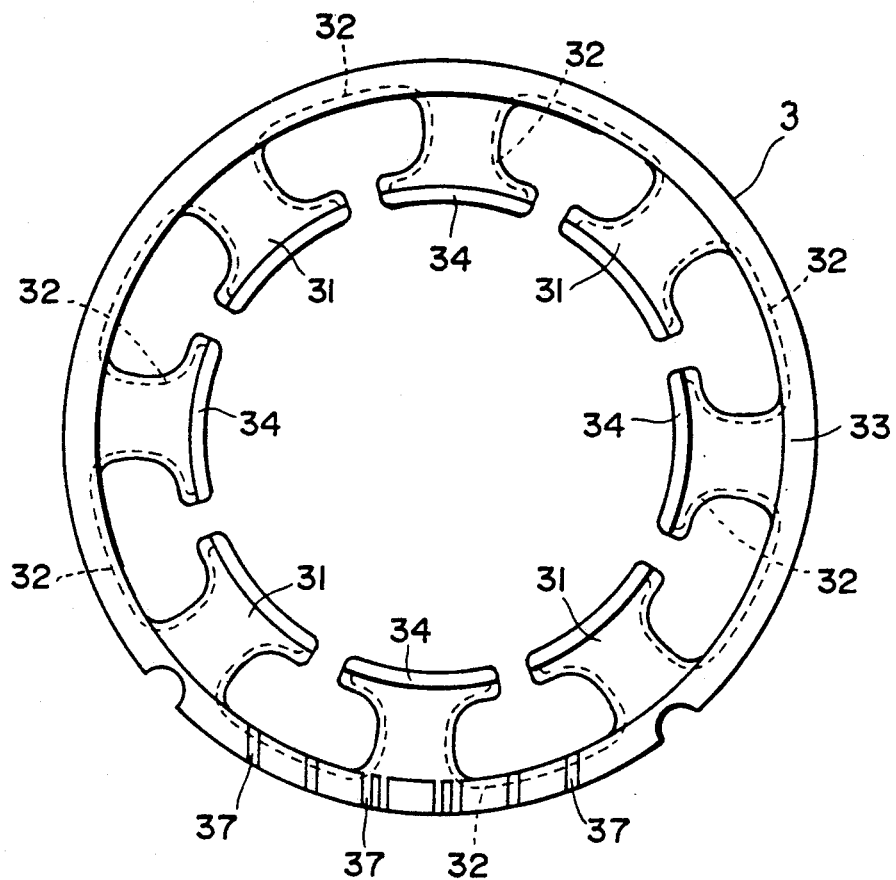
FIG. 7 is a front view of a bobbin used in the stepping motor.
Figure 8:
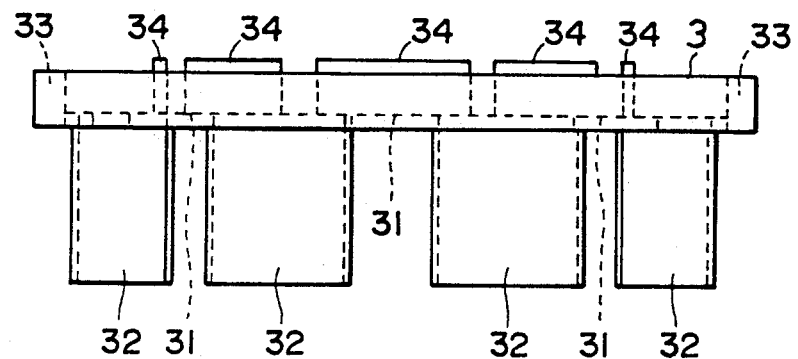
FIG. 8 is a side view thereof.

Bobbins 3 formed of an insulating material are mounted to both axial end faces of the stator core 1. As shown in FIGS. 7 and 8, the bobbins 3 are each provided with radially projecting portions 31 having the same front shape as the ridges 25 of the stator core 1 and C-shaped cylindrical walls 32 to be fitted in the grooves 2 along the groove surfaces. An annular outer wall 33 is provided projectingly on the outer peripheral edge of each bobbin 3, and arcuate walls 34 are provided projectingly on the inner peripheral edges of the projecting portions 31, both concentrically with the stator core 1. One bobbin 3 is mounted to each of both axial end faces of the stator core 1, and the cylindrical walls 32 are fitted in the grooves 2 of the stator core 1 so as to be in close contact with the groove surfaces, while the projecting portions 31 are brought into abutment with end faces of the ridges 25 of the stator core 1.

In the mounted state of the bobbins 3 to the stator core 1, stator coils 4 are wound round the ridges 25 of the stator core. Although in FIG. 4 the stator coils 4 are all illustrated in section for clearly showing an interrelation among the stator core 1, bobbin 3, stator coils 4 and later-described first and second support members, portions of the stator coil 4 positioned on both sides of each ridge 25 in close contact therewith are of a single coil. A stator 5 indicates an assembly comprising the stator core 1, bobbins 3 mounted thereto and stator coils 4 wound round the core.

A first support member 7 and a second support member 6 are fixed, in a row along the axial direction of the stator core 1, to part of the outer peripheral surface of the stator core 1. The first support member 7 is formed of an insulating material and is provided at one end thereof with a flange 72 having an engaging surface 71, the engaging surface 71 being engaged with one end face (hereinafter referred to as the "first end face") 51 out of both axial end faces of the stator core 1 and extending radially inwards of the stator core 1. At the other end the first support member 7 is provided with an end portion 73 having a surface perpendicular to the axis of the stator core 1, and between the engaging surface 71 and the end portion 73 the first support member 7 is further provided with an arcuate surface which is in close contact with the cylindrical outer peripheral surface of the stator core 1.

The second support member 6 is formed of an insulating material and has an end portion 63 which has a surface perpendicular to the axis of the stator core 1 and which comes into abutment with the end portion 73 of the first support member 7. In the second support member 6, a plurality of terminal plates 61 and 62 (in the figure, three terminal plates 61 and three terminal plates 62, that is, a total of six terminal plates) are embedded and fixed at L-bent portions formed at respective longitudinal central portions. Out of both end portions thereof, first end portions are projected from the second support member 6 in the radial direction of the stator core 1 to form a male connector as will be described later. On the other hand, second end portions of the terminal plates are projected from the second support member 6 in parallel with the axis of the stator core 1 and extended along the outer surface of the first support member 7. Free ends 64 thereof are bent radially inwards of the stator core 1 along the outer surface of the flange 72 of the first support member 7, and an end portion 42 of an electric wire drawn out from each stator coil 4 is connected to each free end 64 electrically by soldering or any other suitable means. The surface of the second support member 6 which faces the stator core 1 has an arcuate surface which is in close contact with the outer surface of the stator core 1.

The first and second support members 7, 6 are bonded to the outer surface of the stator core 1 by an insulating adhesive at said arcuate surfaces thereof, or lugs 21 formed integrally with the support members 6 and 7 are fitted in recesses 20 formed axially in the outer surface of the stator core 1, or both such bonding and fitting are combined, whereby the first and second support members are fixed to the stator core 1. In the top portion of the outer wall 33 of each bobbin 3 there are formed a plurality of grooves 37 in positions close to the flange 72 of the first support member 7, and the end portions of the electric wires drawn out from the stator coils 4 are retained in the grooves 37. The wire ends 42 thus retained in the grooves are then connected to the free ends 64 of the terminal plates 61 and 62.

After the bobbins 3 and the first and second support members 7, 6 are fixed to the stator core 1, followed by winding of the stator coils 4 round the ridges 25 of the stator core 1 and subsequent connection of the constituent electric wire ends 42 of the stator coils to the free ends 64 of the terminal plates 61, 62 the stator 5 is supported by both an inner mold which is in close contact with the inner peripheral surface of the stator core 1 having the pole teeth 26 of the ridges 25 and an outer mold which grippingly holds the terminal plates 61 and 62 being projected radially from the stator core 1 from the outer peripheral surface of the second support member 6, the inner and outer molds being not shown in the drawings. In this state, an insulating synthetic resin is injected inside the molds by an injection molding method to form a housing 8 which covers the stator core 1, outer surface of the first and second support members 7, 6 the bobbins 3 projecting from both axial end faces of the stator core 1 and the stator coils 4. A bearing housing 9 which houses therein a bearing 11 supporting one end of a rotor shaft 16 and a flange 81 for fixing a cover 12 are formed integrally with the housing 8 at the time of the above-noted injection molding. Further formed integrally with the housing 8 is a socket wall 82 which surrounds two rows of terminal plates comprising three terminal plates 61 and three terminal plates 62, in an outer peripheral position of the second support member 6, to form a male connector 83.

During injection molding of the housing 8, the constituent electric wire ends 42 of the stator coils 4 which have been drawn out from the stator coils 4 and connected to the free ends 64 of the terminal plates 61 and 62 are exposed to the inside of the molds and come into contact with molten resin. However, since the wire ends 42 are supported by the bobbins 3 through the grooves 37 formed in the top portion of the outer wall 33 of each bobbin, there is no possibility of the wire ends being broken by the force based on the flow of the resin nor is there any possibility of peeling off of the soldered connection with the free ends 64 of the terminal plates 61 and 62.

After the synthetic resin molding of the housing 8, a coned disc spring 10 and the bearing 11 are disposed into the bearing housing 9 in the housing 8 through the inner space of the stator 5, whereby one end of the rotor shaft 16 is supported rotatably. Onto the rotor shaft 16 is fixed an annularly-formed permanent magnet 18, and two rotor cores 15 and 17 are fixed to both axial ends of the permanent magnet 18. The rotor cores 15 and 17 are each a laminate of annular plates each formed by blanking of a silicon steel plate. On the outer peripheral surfaces of the rotor cores 15 and 17, there are formed a large number of ridge-like pole teeth of a small width at intervals opposed to the pole teeth 26 formed on the ridges 25 of the stator core 1 and are extended in parallel with the rotor shaft 1. The pole teeth formed on the outer peripheral surface of the rotor core 15 fixed on S pole side of the permanent magnet 18 and the pole teeth of the rotor core 17 fixed on N pole side are displaced a half pitch from each other in the circumferential direction, and the pole teeth of the rotor core 15 are on the same line as the grooves between pole teeth of the rotor core 17. The other end portion of the rotor shaft 16 is supported by a bearing 14 which is supported in a bearing housing 13 formed on the cover 12, the cover 12 being a metallic cover such as an aluminum cover. The cover 12 is fixed to the flangs 81 of the synthetic resin housing 8 through a flange 19 thereof.

According to the present invention, the first and second support members 7 and 6 are disposed on the outer peripheral surface of the stator core 1 in the axial direction of the stator core, and in the first support member 7, the distance (a) from the engaging surface 71 in abutment with the first end face 51 of the stator core 1 up to the end portion 73 can be made coincident with a predetermined value, while in the second support member 6, the distance (b) between the end portion 63 in abutment with the end portion 73 of the first support member 7 and the first end portions of one row of terminal plates 61 can be rendered coincident with a predetermined value. Therefore, when the engaging surface 71 of the first support member 7 is engaged with the first end face 51 out of both end faces of the stator core 1 to fix the first support member 7 to the outer peripheral surface of the stator core 1 and then the end portion 63 of the second support member 6 is brought into abutment with the end portion 73 of the first support member 7 to fix the second support member 6 to the outer peripheral surface of the stator core 1, the distance (a+b) from the first end face 51 of the stator core 1 to the first end portions of one row of terminal plates 61 along the axis of the stator core 1 can be made coincident with the predetermined value Ho. On the other hand, since the mold for molding the housing 8 is designed with the first end face 51 of the stator core 1 as the fiducial plane M, there can be molded a male connector 83 wherein the above-noted row of the first end portions of the terminal plates 61 is located in a predetermined position within the space surrounded by the socket wall 82 formed integrally with the housing 8. As a result, a female connector for feeding an electric current to the stepping motor can be connected smoothly to the male connector 83 and there is no possibility of the first end portions of the terminal plates 61 and 62 being bent at the time of connection of the female connector or of an accident of the female connector being unable to be inserted into the socket wall 82.

Further, since plural grooves 37 are formed in the outer wall 33 formed at the peripheral edge portion of the bobbin 3 which is in abutment with the first end face 51 out of both axial end faces of the stator core 1 and the end portions 42 of the electric wires which constitute the stator coils 4 are retained in the grooves 37 and connected to the free ends 64 of the terminal plates 61, 62 it is not likely at all that the electric wires will be pulled and broken with force induced by the flowing, molten, synthetic resin in the mold at the time of molding of the housing 8, nor is there any possibility of breakage of the connection between the electric wire end portions 42 and the free ends 64 of the terminal plates.

What is claimed is:

1. A stepping motor including:
   a stator core which is a laminate of thin steel plates, said stator core having a cylindrical outer peripheral surface and an inner peripheral surface on which are formed a plurality of axially extending ridges and grooves formed alternately in a circumferential direction;
   bobbins formed of an insulating material and held in abutment with at least both axial end faces of said stator core;
   stator coils wound round said ridges from above-said bobbins,
   a first support member formed of an insulating material and fixed to a part of the outer peripheral surface of said stator core, said first support member having an engaging surface for abutment with a first end face out of both axial end faces of the stator core;
   a second support member formed of an insulating material and fixed to a part of the outer peripheral surface of said stator core between an end portion of said first support member and a second end face out of both axial end faces of the stator core;
   a plurality of terminal plates each having a central portion fixed in the interior of said second support member, a first end portion and a second end portion, said first end portion being projected in a radial direction of said stator core, said second end portion being projected axially of the stator core from the outer surface of the second support member and extending along an outer surface of said first support member, with end portions of electric wires which constitute said stator coils being connected to said second end portions of the terminal plates;
   a housing formed by molding of a synthetic resin, said housing covering said outer peripheral surface of said stator core, the outer surface of said first and second support members, further covering said bobbins and stator coils projecting from both axial end faces of the stator core; and
   a male connector comprising said first end portions of said terminal plates extending in the radial direction of said stator core from said second support member and being made projected through said housing to an outer peripheral surface of the housing and a socket wall formed integrally with said housing in surrounding relation to said first end portions.

2. A stepping motor according to claim 1, wherein a plurality of grooves are formed in an outer peripheral edge of the bobbin mounted to the first end face of said stator core, and end portions of the electric wires which constitute said stator coils are retained in said grooves.

3. A stepping motor according to claim 1, wherein said first support member is provided at one end portion thereof with a flange, said flange having the engaging surface in abutment with said first end face of said stator core and extending radially inwards of said stator core along said first end face, said first support member is provided at an opposite end portion thereof with an end face having a surface perpendicular to the axis of said stator core, and said second support member is provided at one end portion thereof with an end face having a surface perpendicular to the stator core axis and is in abutment through said end face with the end face of said first support member.

4. A stepping motor according to claim 1, wherein said stator core has a groove formed in the outer peripheral surface thereof in parallel with the axis thereof, and said first and second support members each has an arcuate surface for close contact with the outer surface of said stator core and an elongated projection for engagement with said grooves.

5. A stepping motor according to claim 3, wherein a plurality of grooves are formed in an outer peripheral edge of the bobbin mounted to said first end face of said stator core, and end portions of the electric wires which constitute said stator coils are retained in said grooves, then drawn out onto said flange of said first support member and connected to said second end portions of said terminal plates.

* * * * *